United States Patent
Kusterer et al.

(10) Patent No.: US 7,308,676 B2
(45) Date of Patent: Dec. 11, 2007

(54) GENERIC LAYER FOR VIRTUAL OBJECT RESOLUTION

(75) Inventors: Stefan Kusterer, Nussloch (DE); Eckart Liemke, Heidelberg (DE); Gerhard Bosch, Reilingen (DE); Juergen Heymann, Heidelberg (DE); Meinolf Block, Heidelberg (DE); Bernhard Drittler, Walldorf (DE)

(73) Assignee: SAP AG, Walldorf (DE)

( * ) Notice: Subject to any disclaimer, the term of this patent is extended or adjusted under 35 U.S.C. 154(b) by 545 days.

(21) Appl. No.: 10/331,099

(22) Filed: Dec. 26, 2002

(65) Prior Publication Data
US 2003/0225925 A1  Dec. 4, 2003

Related U.S. Application Data

(60) Provisional application No. 60/346,407, filed on Dec. 28, 2001.

(51) Int. Cl.
*G06F 9/44* (2006.01)
(52) U.S. Cl. .............. 717/108; 717/106; 717/115; 717/116; 717/117; 717/122; 717/123
(58) Field of Classification Search .............. None
See application file for complete search history.

(56) References Cited

U.S. PATENT DOCUMENTS 5,001,268 A    3/1991  Johnson et al.
5,632,034 A *  5/1997  O'Farrell ............... 717/140
5,995,753 A *  11/1999  Walker ................... 717/108

(Continued)

FOREIGN PATENT DOCUMENTS

EP    0994425 A2    4/2000

(Continued)

OTHER PUBLICATIONS

May, "Integration of XML Data in XpathLog", *Caise Workshop Data Integration Over the Web*, 'Online! Interlaken, Switzerland, Retrieved from the Internet: URL:http://www.dbis.informatik.uni-goettingen.de/Publics/01/caise-2001.ps, retrieved on Oct. 15, 2003.

(Continued)

*Primary Examiner*—Tuan Dam
*Assistant Examiner*—Chuck Kendall
(74) *Attorney, Agent, or Firm*—Mintz, Levin, Cohn, Ferris, Glovsky and Popeo, P.C.

(57) ABSTRACT

Systems and techniques to derive virtual objects at run-time from persistencely stored objects. In general, in one implementation, the technique includes receiving a request for a target object from a requesting application. It is determined whether a delta link is associated with the target object. The delta link includes a location of the target object and information describing a desired difference between the target object and a derived object to be returned to the requesting application. The target object is located and a derived object is generated from the target object and the information in the delta link. The derived object is then returned to the requesting application. The target object, and derived object, may include a number of elements. The elements may be name-value pairs, or "properties", or a number of child objects in an object hierarchy.

33 Claims, 10 Drawing Sheets

U.S. PATENT DOCUMENTS 6,128,655 A     10/2000   Fields et al.
6,418,447 B1 *   7/2002   Frey et al. .............. 707/103 R
6,470,344 B1    10/2002   Kothuri et al.

FOREIGN PATENT DOCUMENTS

WO      WO 01/33435     5/2001

OTHER PUBLICATIONS

Gershman, "Implementation of Binary Trees", tutorial, 'Online! Nov. 10, 2000, retrieved from the Internet: URL:http://www.ece.mcmaster.ca/lgershman/coe2si4_tut7.pdf retrieved on Oct. 15, 2003! Section "Combining two subtrees into a single tree".

* cited by examiner

```
+------------+-------+--------------------------------------------------+
| name       | value | attributes                                       |
+------------+-------+--------------------------------------------------+
| MasterLink | null  |                                                  |
+------------+-------+--------------------------------------------------+
| A          | 1     | inheritance = "final", scope="cross-user"        |
+------------+-------+--------------------------------------------------+
| B          | 1     | inheritance = "non-final", scope="cross-user"    |
+------------+-------+--------------------------------------------------+
| C          | 3     | inheritance = "non-final", scope="cross-user"    |
+------------+-------+--------------------------------------------------+
| D          | 1     | inheritance = "non-final", scope="user-specific" |
+------------+-------+--------------------------------------------------+
```

| name | value | attributes |
|---|---|---|
| MasterLink | address | |
| A | 2 | inheritance = "final", scope="cross-user" |
| B | 2 | inheritance = "non-final", scope="cross-user" |

FIG. 4

| name | value | attributes |
|---|---|---|
| MasterLink | null | |
| A | 1 | inheritance = "final", scope="cross-user" |
| B | 2 | inheritance = "non-final", scope="cross-user" |
| C | 3 | inheritance = "non-final", scope="cross" |
| D | 1 | inheritance = "non-final", scope="user-specific" |

FIG. 5

```
delta_link      = '<DELTA_LINK target = "'object_id'">'
                    [ minus_entries ]
                    [ plus_entries ]
                  '</DELTA_LINK>' minus_entries   = '<MINUS_ENTRIES>'
                    1*( "<MINUS_ENTRY target="'relative_object_id'" />' )
                  '</MINUS_ENTRIES>' plus_entries    = '<PLUS_ENTRIES>'
                    1*( plus_entry )
                  '</PLUS_ENTRIES>' plus_entry      = '<PLUS_ENTRY target="'relative_object_id'" position="'position'">'
                    plus_content
                  '</PLUS_ENTRY>' position        = 'BEFORE' | 'AFTER' | 'FIRST_CHILD' | 'LAST_CHILD'
plus_content    = basic_folder | simple_content_object
```

FIG. 6

GENERIC LAYER FOR VIRTUAL OBJECT RESOLUTION

CROSS REFERENCE TO RELATED APPLICATIONS

This application claims the benefit of priority from U.S. Provisional Application entitled "PORTAL CONTENT DELIVERY", filed Dec. 28, 2001, application Ser. No. 60/346,407, the disclosure of which is incorporated by reference in its entirety.

COPYRIGHT NOTICE

A portion of this disclosure contains material which is subject to copyright protection. Specifically, portions of source code, scripting language and program model and design information appear in the specification. The copyright owner has no objection to the facsimile reproduction of the specification as filed. Otherwise all copyright rights are reserved.

BACKGROUND

The following description relates to software layers in computer systems, for example, a generic layer for virtual object resolution.

Computer systems may include different software layers. Objects may be stored in a persistence layer and utilized in a presentation layer, which represents the run-time environment of the computer system. Objects may be passed between the software layers, e.g., from the persistence layer to the presentation layer for utilization by a requesting software application.

The term "object" may refer to discrete objects, which may hold data in the form of name-value pairs, or "properties". For example, a web page may be defined by an object including a number of name-value pairs which correspond to, for example, background color, font, layout, and page content.

The term "object" may also refer to object hierarchies, which may include a top-most "parent" object with many depending, or "child", objects below it on the hierarchy. An object hierarchy may be used to organize data and enable a user to navigate efficiently through data stored in the hierarchy.

An object may be pre-defined and stored in a computer system, e.g., in a database or system memory. The object may be accessed by different applications in different contexts. The context may depend on the device or browser in which the application is running or be specific to the user of the application. It may be desirable to present different versions of the object in different contexts. Multiple versions of the object may be stored in the database, however, this may create inefficiencies relating to addressing the object and storage capacity.

SUMMARY

The present application teaches generating virtual objects for presentation to a requesting application from objects stored in a persistence layer in a computer system. The present inventors recognized that it may be desirable to return different versions of a stored object based on the context of the application requesting the object. Accordingly, the inventors recognized the potential advantages of providing a generic layer that can generate a virtual object from a delta link referencing the requested object.

In one aspect, a computer system includes several software layers. Objects may be stored in a persistence layer. Objects may be presented to requesting applications in a presentation layer at run-time. A generic layer includes delta links pointing to corresponding target objects in the persistence layer. A delta link includes a location of the target object and information describing a desired difference between the target object and a derived object to be presented to the requesting application at run-time. The generic layer may include a module that intercepts a request from the application for the target object, locates the target object in the persistence layer, and generates the derived object from the target object and the information in the delta link. The generic layer then returns the derived object to the requesting application.

The target object may include a number of name-value pairs. The module may replace values in the target object with values in the delta link when generating the derived object. Alternatively, the target object may be an object hierarchy including a parent object and a number of child objects. The module may omit or add objects to the object hierarchy when building the derived object.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 3 illustrates an object including properties/

FIG. 4 illustrates a delta link for the object in FIG. 3.

FIG. 5 illustrates a derived object generated by merging the delta link in FIG. 4 and the object in FIG. 3.

FIG. 6 shows a code template for a delta link.

Like reference symbols in the various drawings indicate like elements.

DETAILED DESCRIPTION

The systems and techniques described here relate to software layers in computer systems, and more particularly, a generic layer for virtual object resolution.

Figure 1:
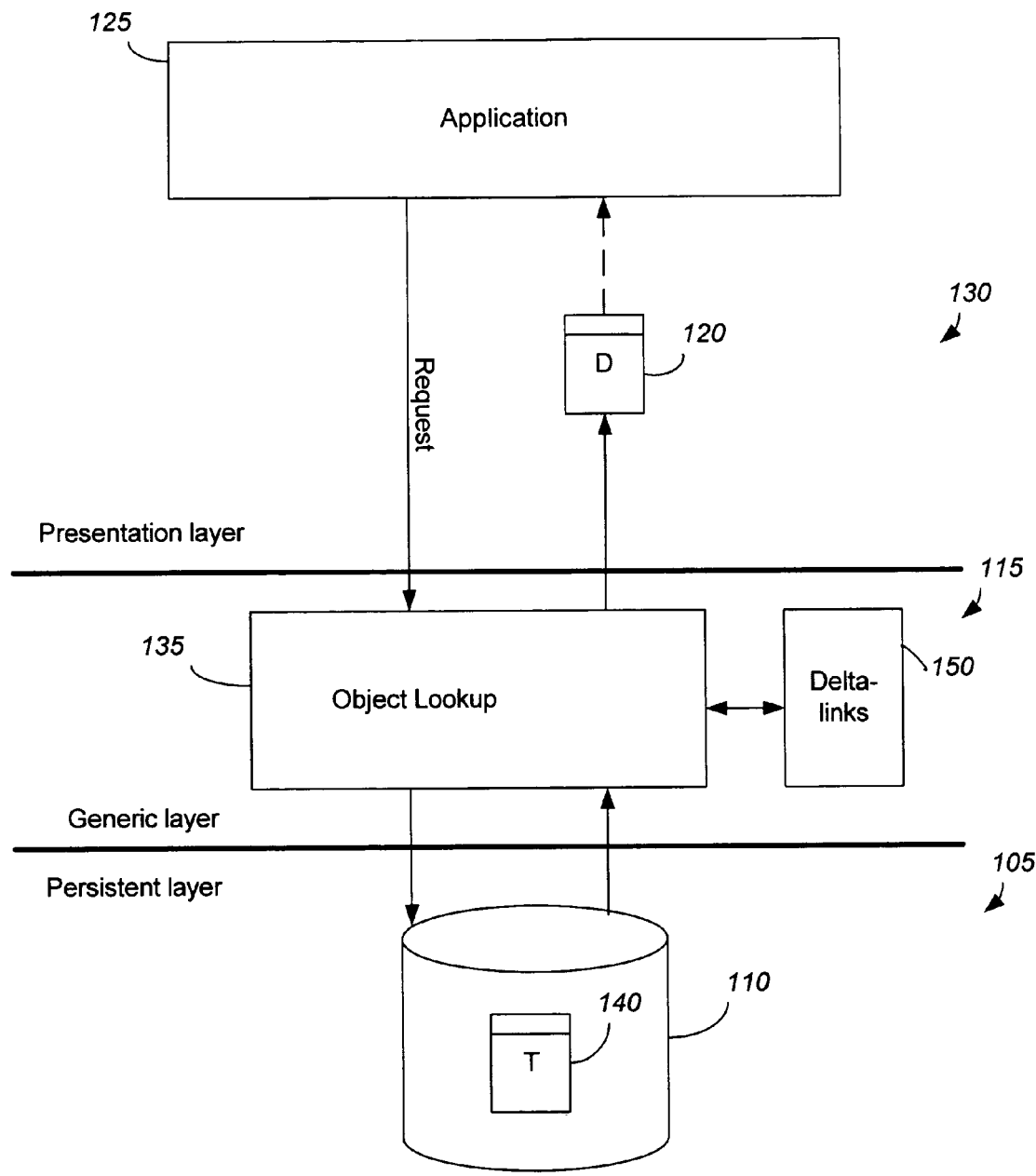
FIG. 1 shows a block diagram of software layers in a computer system.

FIG. 1 illustrates functional layers of a software product in a computer system. Objects may be stored in a persistence layer 105, which may include, e.g., a database 110. A generic layer 115 may generate objects derived from the stored objects at run-time. The derived objects may be presented to a requesting application 125 in a presentation layer 130. The presentation layer 130 may represent a run-time environment of the computer system, whereas the persistence layer 105 may represent the design-time environment developed at or prior to installation of the software product in the computer system.

Objects stored in the persistence layer 105 may include a number of name-value pairs, or "properties". The persistence layer may also store hierarchies of objects, e.g., a folder hierarchy. An object in the hierarchy may depend from another object above it in the hierarchy. The depending object may be referred to as a "child" object, and the object from which it depends a "parent" object. A parent object may be a child of another object. An object hierarchy may itself be considered an object, which is identified by the top-most parent object.

Generally, an object contains one or more elements: In the case of discrete objects, the elements may be properties, and in the case of object hierarchies, the elements may be child objects depending from the top-most parent object.

It may be desirable to present the application 125 with a modified version of an object in the persistence layer based on the user of the application's context. Different version of the underlying object 140 may be appropriate in different contexts. The context may depend on, for example, the particular device or browser in which the application is running, the user's role or group association, or other information, such as the country or language in which the application is operating.

Since an object in the persistence layer 105 may be an underlying object for many different user contexts, it may be desirable to generate a derived object for presentation in the presentation layer 130 without altering the underlying object in the persistence layer 105. A object lookup module 135 may generate a derived object 120 appropriate for a user context from a target object 140 at run-time. The newly generated derived object 120 may then be presented to the application.

The object lookup module 130 may use delta links to generate derived objects at runtime. A delta link may include an identifier for the target object 140. The identifier may be a link or pointer that points to the target object's location in the persistence layer 105. The delta link may include definitions that may be used to change or modify the target object. The modification may not affect the target object, but rather be carried out on an internal object that replaces the delta link at run time, i.e., the derived object. The delta link may store only the "delta," i.e., the differences, between the target object and the derived object.

Figure 2:
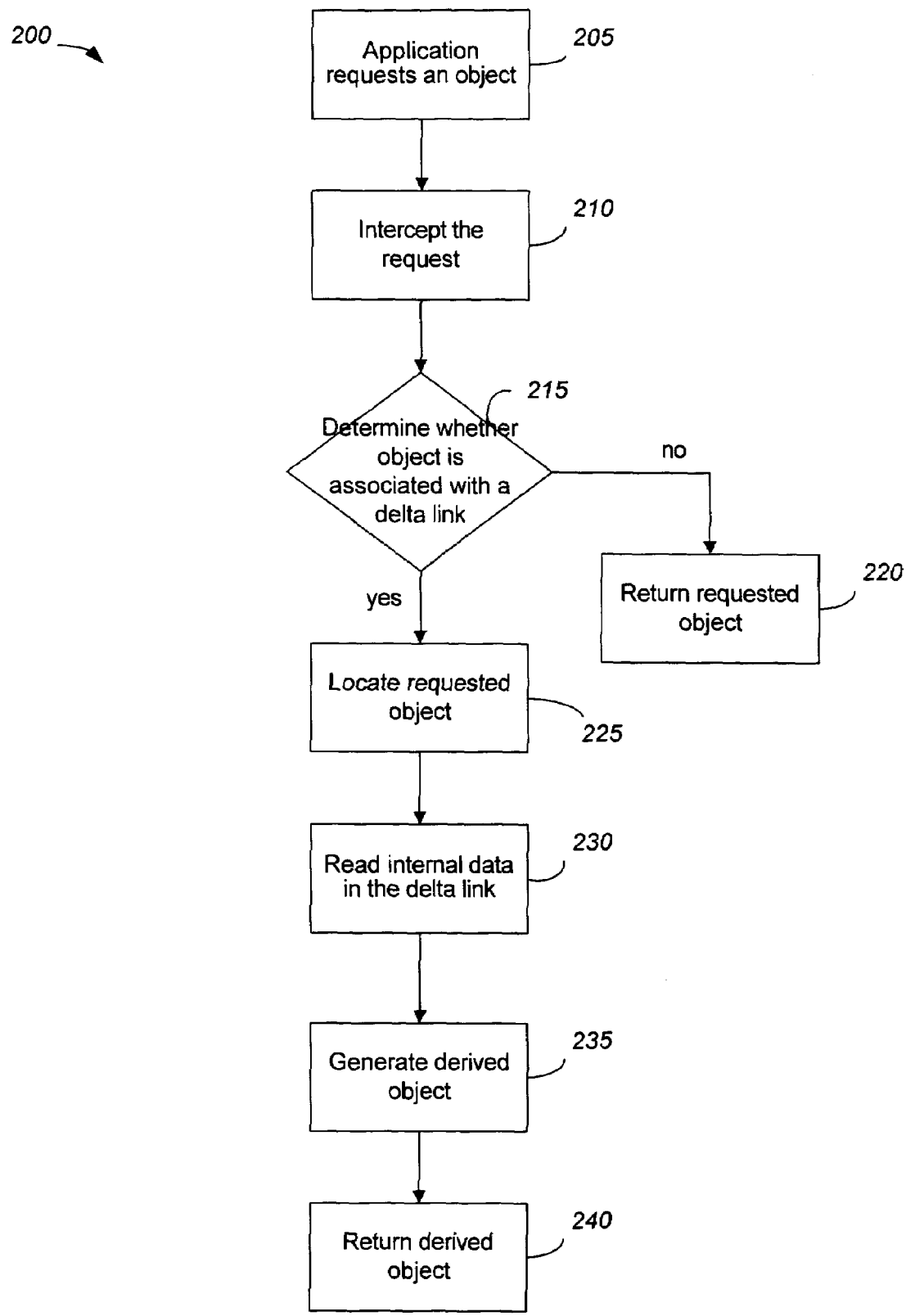
FIG. 2 is a flowchart showing a process for generating a derived object from a stored object for presentation to a requesting application.

FIG. 2 is a flowchart depicting a delta link resolution operation 200 that may be performed by the object lookup module 135. The application 125 may request an object in the persistence layer 105, e.g., by sending a name or address of the object (block 205). The object lookup module 135 may intercept the request (block 210) and determine whether the requested object is associated with a delta link (block 215). If not, the object lookup module 135 may return the object (block 220). If the object is associated with a delta link, the object lookup module 135 may locate the target object (block 225). The object lookup module 135 may then read the internal data in the delta link (block 230) and generate a derived object based on the delta link information and the elements in the target object (block 235). The object lookup module 135 may then return the derived object to the application (block 240).

In an alternative embodiment, all delta links may be resolved at run-time. The resultant delta links may then be stored temporarily in the generic or persistence layer for access by the object lookup module 135.

When resolving a delta link pointing to a discrete object, the object lookup module 135 may "merge" the properties in the delta link and the properties in the target object 140. FIGS. 3 and 4 illustrate a target object 300 and a delta link 400, respectively. The target object 300 has four properties 302-305, i.e., the name value pairs A:1, B:1, C:3, and D:1, respectively. Each property may be bound to a set of attributes, which control the algorithm for merging the properties of the target object and the delta link to generate the derived object. In this example, the properties have the associated attributes "inheritance" and "scope". The inheritance attribute may indicate which properties can and cannot be modified by a delta link, e.g., the "non-final" and "final" values, respectively. The scope attribute may identify which properties can be personalized by a user and which apply to all user, e.g., the "user specific" and "cross-user" values, respectively. The delta link 400 may include a link 405 to the target object and modified properties 410 and 415, i.e., the name value pairs A:2 and B:2, respectively.

The object lookup module may merge the properties in the delta-link 400 with the properties in the target object 300 to generate a derived object 500, shown in FIG. 5. Like the target object 300, the derived object has four properties 502-505, i.e., A:1, B:2, C:3, and D:1, respectively. The value for A is in the derived object is unchanged from the target object because A has a "final" inheritance value. The value for B in the derived object is that defined in the delta link since B has a "non-final" inheritance value. The values for C and D are unchanged since the delta link did not include these properties.

Delta links may be used with a variety of different discrete objects. For example, the target object described above may define a web page for a company's portal. The properties in the object may define, e.g., the layout of the page (background color, fonts, etc.), hyperlinks, and content, such as a telephone number for a reception desk at the main office. The delta link may be defined by a branch office of the company to generate a similar web page, but modified to reflect the specific context of the subsidiary, e.g., a the telephone number for a reception desk at the branch office.

When resolving a delta link pointing to a object hierarchy, the object lookup module 135 may build a virtual tree from the target object hierarchy and the information in the delta link. A delta link for an object hierarchy may have the structure shown in FIG. 6. The target attribute value 605 in the <DELTA_LINK . . . > tag defines the target object hierarchy. The object_id is a unique identifier for the derived object hierarchy.

The delta link may include a list of entries that define subtractive (MINUS_ENTRIES 610) and additive (PLUS_ENTRIES 615) alterations to the target object hierarchy. For the <MINUS_ENTRY>-tag and <PLUS_EN-TRY>-tag, the target attribute has the value (relative_object_id), which is a relative URL using object_id as its root.

The definition of an entry to be removed from the hierarchy is sufficient for the <MINUS-ENTRY>-tag. The <PLUS-ENTRY>-tag may require positional information identifying where the new entry should be included in the derived structure. The position attribute 625 defines where the additional entries should be located. Possible values include:

BEFORE, indicating that the new entry should be placed directly before the target entry;

AFTER, indicating that the new entry should be placed directly behind the target entry;

FIRST_CHILD, indicating that the additional entry is to be included in this folder as the first (top most) item; and LAST_CHILD, indicating that the additional entry is to be included in this folder as the last (bottom) element.

Figure 7:
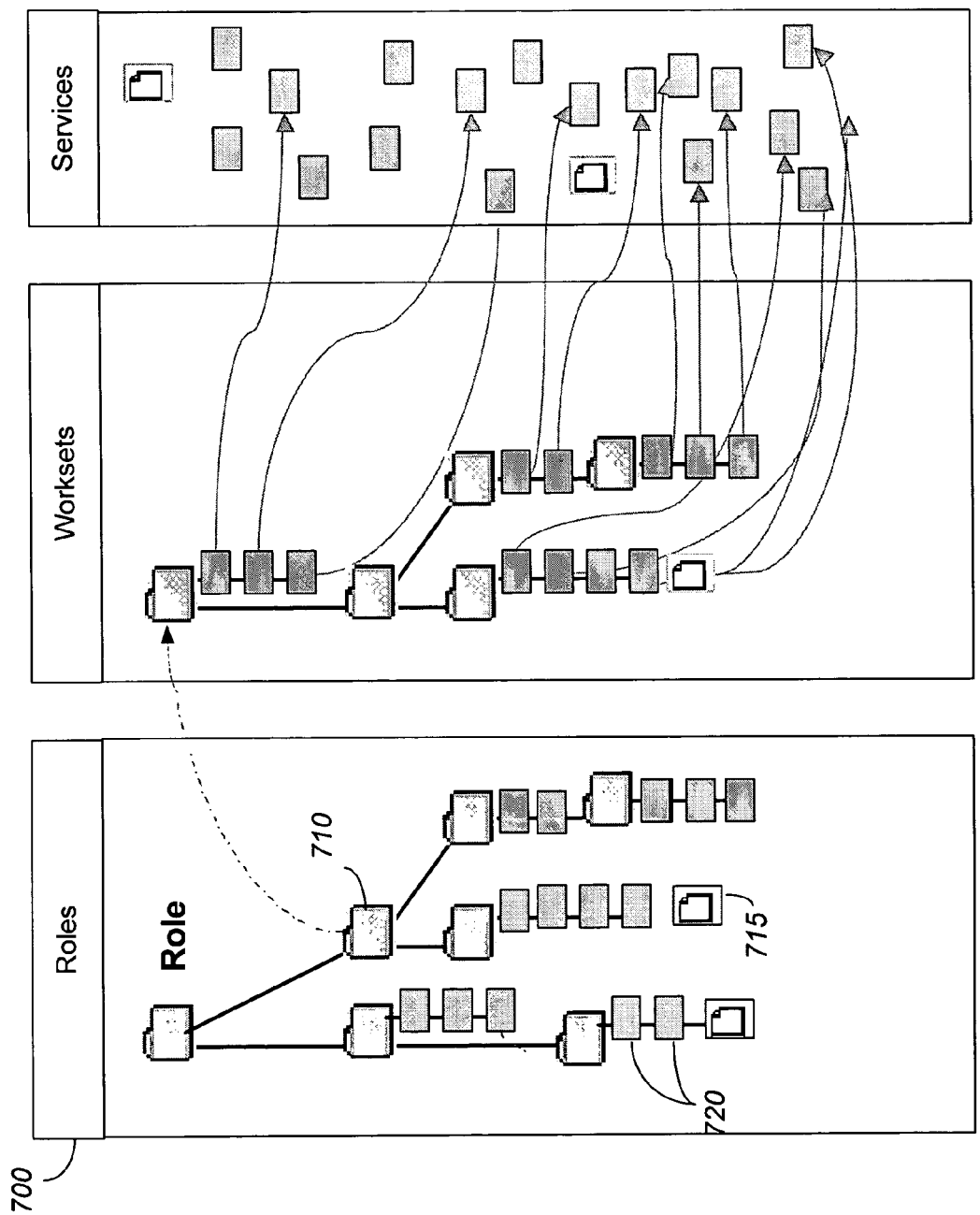
FIG. 7 is a block diagram of a role object hierarchy.

The delta link technique may be used to adapt an object that has been pre-defined in a generic system to the needs of companies in a given industry. For example, a user may be assigned a role in a company, e.g., "manager", "engineer", or "human resources administrator". An object hierarchy may be created for the role. FIG. 7 shows the structure of an exemplary role object. The role object may be a hierarchy of objects, e.g., folders 705, worksets 710, pages, 715 and services 720, which may be useful to users assigned that role. The object hierarchy may be structured to provide easy, intuitive navigation through the role.

Figure 8:
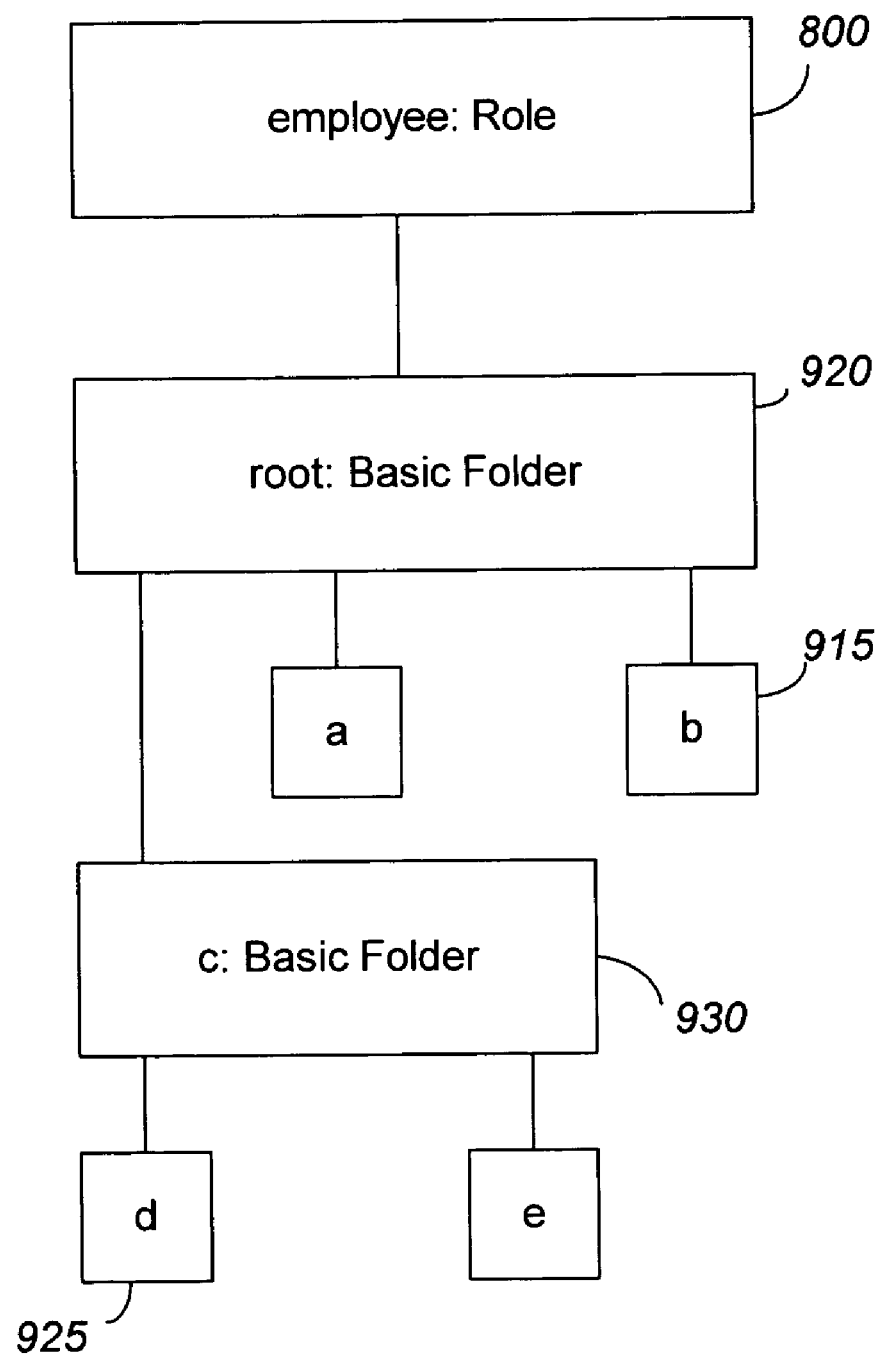
FIG. 8 is a block diagram of a target object hierarchy.

In an example, a role "employee" 800 (shown in FIG. 8) is tailored to the requirements of organizations in the public sector by deriving a role named "employee public sector" from the "employee" role. Referring to 2, when the application requests the employee role (block 205), the object lookup module 135 may intercept the request (block 210) and determine that the employee role is associated with a delta link 1000 (block 215). The object lookup module 135 may then locate the target object in the persistence layer 105 (block 225). The object lookup module 135 may read the internal data in the delta link (block 230) and use this information to build a virtual tree corresponding to the derived object "employee public sector" (block 235).

Figure 9:
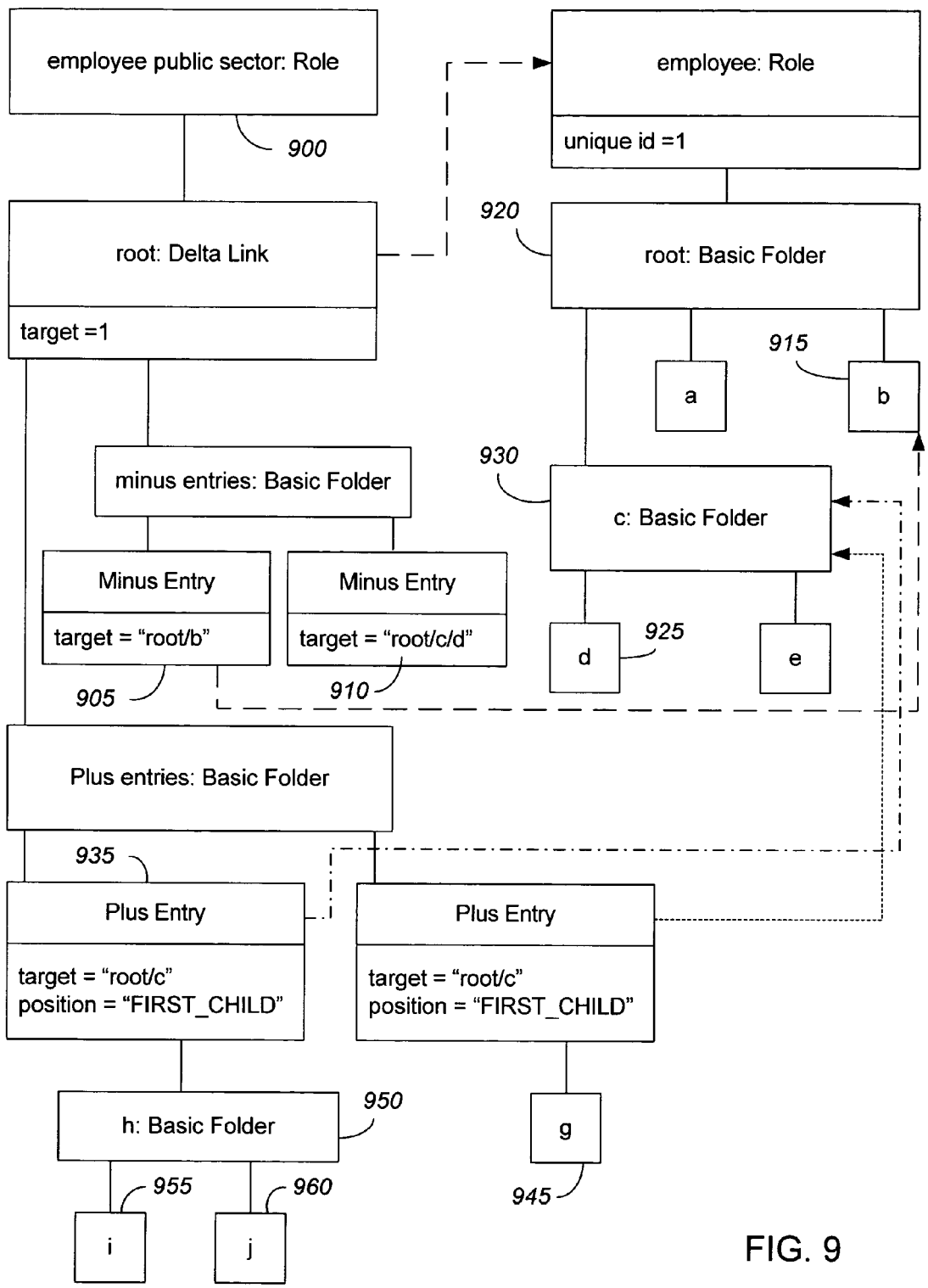
FIG. 9 is a block diagram representing a delta link for the target object hierarchy in FIG. 8.
Figure 10:
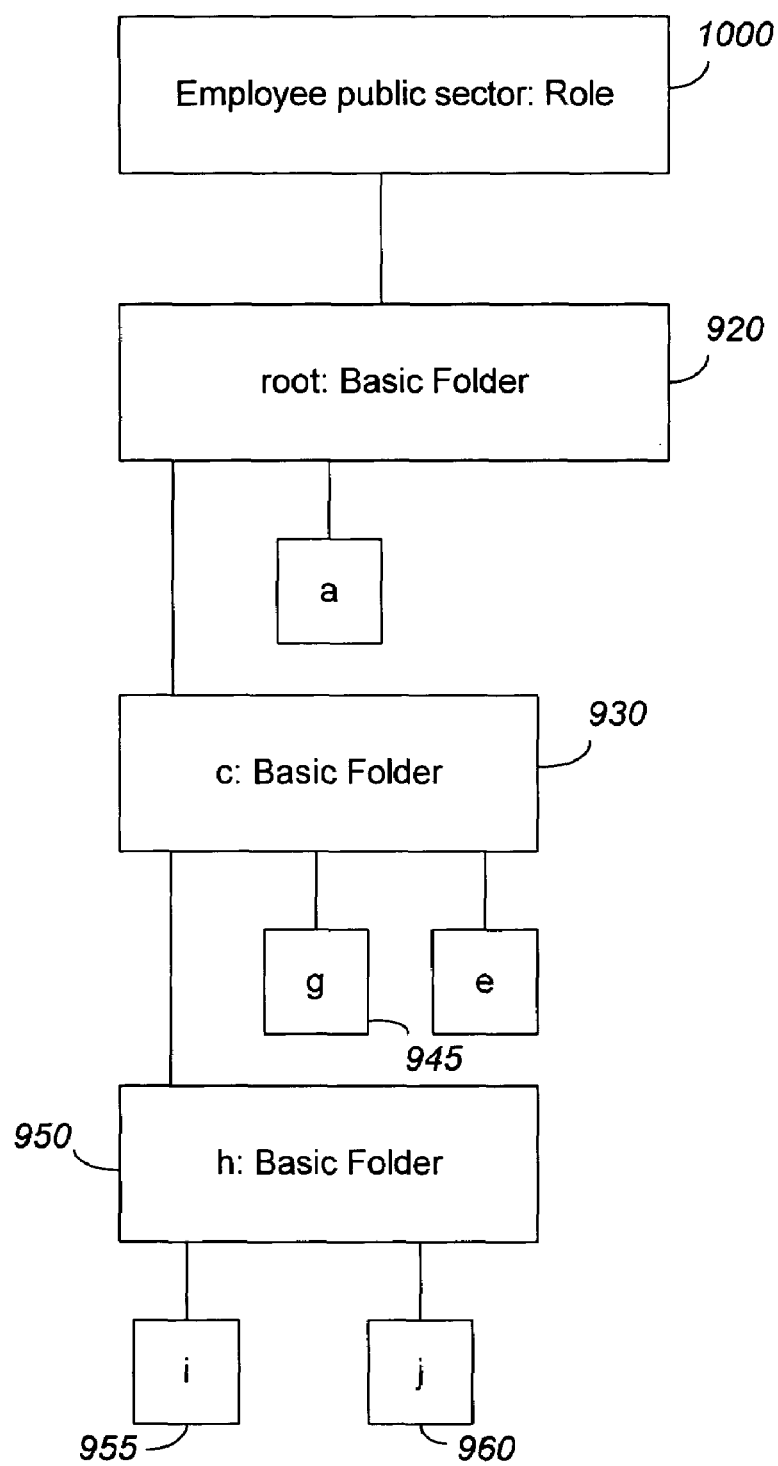
FIG. 10 is a block diagram of a derived object hierarchy generated from the target object hierarchy in FIG. 8 and the delta link in FIG. 9.

FIG. 9 illustrates the structure of the delta link 900 for the "employee public sector" role. The minus entries 905 and 910 identify the targets "root/b" and "root/c/d". Accordingly, entry "b" 915 is removed from the "root" folder 920 and entry "d" 925 is removed from the "c" folder 930 when building the virtual tree for the derived object. The plus entries 935 and 940 identify a new entry "g" 945 and a new folder "h" 950 in the "c" folder. The new folder "h" includes the new entries "i" 955 and "j" 960. The definition of the "employee public sector" role 1000 is resolved as shown in FIG. 10. The derived role "employee public sector" differs from the target role, "employee" 800, in that entry "b" in the top level content object and entry "d" in folder "c" are removed from the "employee" object hierarchy. Also, a single entry "g" and a folder "h" with two new entries, "i" and "j", are added to folder "c" of the "employee" role.

After the delta link is resolved, the object lookup module 135 may return the derived object, i.e., the "employee public sector" role 1000, to the application 125 (block 240).

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. The logic flows depicted in the accompanying figures do not require the particular order shown, or sequential order, to achieve desirable results. In certain implementations, multitasking and parallel processing may be preferable.

Other embodiments may be within the scope of the following claims.

What is claimed is:

1. A method comprising:
receiving a request for a target object;
identifying a delta link associated with the target object, the delta link including a location of the target object and information describing a desired difference between one or more elements of the target object and one or more elements of a derived object to be returned;
locating the target object;
generating the derived object by using the target object and the information in the delta link, including the information describing the desired difference; and
returning the derived object.

2. The method of claim 1, wherein the target object includes a first plurality of elements.

3. The method of claim 2, wherein the derived object comprises a second plurality of elements including one or more elements from said first plurality of elements.

4. The method of claim 2, wherein said generating the derived object comprises omitting one or more elements in the first plurality of elements in response to the information in the delta link.

5. The method of claim 2, wherein said generating the derived object comprises adding one or more elements not m the first plurality of elements to the second plurality of elements in response to the information in the delta link.

6. The method of claim 1, wherein said receiving a request comprises receiving a request for the target object from an application at run-time, and wherein said returning the derived object comprises returning the derived object to the application.

7. The method of claim 2, wherein said first plurality of elements comprises a plurality of name-value pairs.

8. The method of claim 7, wherein said generating the derived object comprises including in the second plurality of elements a modified version of one of said plurality of name-value pairs.

9. The method of claim 2, wherein said first plurality of elements comprise a hierarchy of child objects.

10. A method comprising:
receiving a request for a target object, the target object including a first plurality of properties;
identifying a delta link associated with the target object, the delta link including a second plurality of properties corresponding to properties in said first plurality of properties but having different values, the second plurality of properties representative of desired differences between the target object and a derived object;
locating the target object;

generating the derived object by including the first plurality of properties and substituting at least one value in the second plurality of properties for at least one corresponding values in the first plurality of properties and returning the derived object.

11. The method of claim 10, wherein each of the properties in the first and second pluralities of properties comprise an attribute describing a priority of a value in the property; and wherein said generating the derived object comprises replacing a value in the first plurality of properties with a corresponding value in the second plurality of properties having a higher priority than the corresponding value in the first plurality of properties.

12. A method comprising:

receiving a request for a target object hierarchy including a first plurality of objects;

identifying a delta link associated with the target object hierarchy, the delta link including a location of the target object hierarchy and information indicating one or more objects in the first plurality of objects to be omitted from a derived object hierarchy to be returned, the information representative of a desired difference;

locating the target object hierarchy;

generating the derived object hierarchy by building a virtual object hierarchy from objects in the first plurality of objects not indicated to be omitted by the information in the delta link and returning the derived object hierarchy.

13. The method of claim 12, wherein the delta link further comprises information describing an additional object to be including in the derived object hierarchy, and wherein said generating further comprises including the additional object in the hierarchy.

14. The method of claim 13, wherein the information describing the additional object comprises information indicating a position to insert the additional object in the derived object hierarchy.

15. An article comprising a machine-readable medium storing instructions operable to cause one or more machines to perform operations comprising:

receiving a request for a target object;

identifying a delta link associated with the target object, the delta link including a location of the target object and information describing a desired difference between one or more elements of the target object and one or more elements of a derived object to be returned;

locating the target object;

generating the derived object by using the target object and the information in the delta link, including the information describing the desired difference and returning the derived object.

16. The article of claim 15, wherein the target object includes a first plurality of elements.

17. The article of claim 16, wherein the derived object comprises a second plurality of elements including one or more elements from said first plurality of elements.

18. The article of claim 16, wherein said generating the derived object comprises omitting one or more elements in the first plurality of elements in response to the information in the delta link.

19. The article of claim 16, wherein said generating the derived object comprises adding one or more elements not m the first plurality of elements to the second plurality of elements in response to the information in the delta link.

20. The article of claim 15, wherein said receiving a request comprises receiving a request for the target object from an application at run-time, and wherein said returning the derived object comprises returning the derived object to the application.

21. The article of claim 16, wherein said first plurality of elements comprises a plurality of name-value pairs.

22. The article of claim 21, wherein said generating the derived object comprises including in the second plurality of elements a modified version of one of said plurality of name-value pairs.

23. The article of claim 16, wherein said first plurality of elements comprise a hierarchy of child objects.

24. An article comprising a machine-readable medium storing instructions operable to cause one or more machines to perform operations comprising:

receiving a request for a target object, the target object including a first plurality of properties;

identifying a delta link associated with the target object, the delta link including a second plurality of properties corresponding to properties in said first plurality of properties but having different values, the second plurality of properties representative of desired differences between the target object and a derived object;

locating the target object;

generating the derived object by including the first plurality of properties and substituting at least one value in the second plurality of properties for at least one corresponding values in the first plurality of properties and returning the derived object.

25. The article of claim 24, wherein each of the properties in the first and second pluralities of properties comprise an attribute describing a priority of a value in the property; and wherein said generating the derived object comprises replacing a value in the first plurality of properties with a corresponding value in the second plurality of properties having a higher priority than the corresponding value in the first plurality of properties.

26. An article comprising a machine-readable medium storing instructions operable to cause one or more machines to perform operations comprising:

receiving a request for a target object hierarchy including a first plurality of objects;

identifying a delta link associated with the target object hierarchy, the delta link including a location of the target object hierarchy and information indicating one or more objects in the first plurality of objects to be omitted from a derived object hierarchy to be returned the information representative of a desired difference;

locating the target object hierarchy;

generating the derived object hierarchy by building a virtual object hierarchy from objects in the first plurality of objects not indicated to be omitted by the information in the delta link; and returning the derived object hierarchy.

27. The article of claim 26, wherein the delta link further comprises information describing an additional object to be including in the derived object hierarchy, and wherein said generating further comprises including the additional object in the hierarchy.

28. The article of claim 27, wherein the information describing the additional object comprises information indicating a position to insert the additional object in the derived object hierarchy.

29. A computer system comprising:
a persistence layer operative to store a target object to a device;
a presentation layer operative to present objects to a requesting application at run-time; and
a generic layer including
a delta link including a location of the target object and information describing a desired difference between one or more elements of the target object and one or more elements of a derived object to be presented to the requesting application, and
a module operative to
receive a request from the application for the target object,
locate the target object in the persistence layer,
generate the derived object from the target object and the information in the delta link the information including the information describing the desired difference, and
return the derived object to the requesting application.

30. The method of claim 29, wherein the target object includes a first plurality of elements.

31. The method of claim 30, wherein the derived object comprises a second plurality of elements including one or more elements from said first plurality of elements.

32. The system of claim 29, wherein the first plurality of element comprise a plurality of name-value pairs.

33. The system of claim 29, wherein the first plurality of element comprise a hierarchy of child objects.

* * * * *